Dec. 4, 1934.  E. J. QUINN  1,982,925
CLUTCH OPERATING MECHANISM
Filed April 24, 1930  3 Sheets-Sheet 1

Inventor
Edward J. Quinn
By Geo. H. Kennedy Jr.
Attorney

Dec. 4, 1934.  E. J. QUINN  1,982,925
CLUTCH OPERATING MECHANISM
Filed April 24, 1930  3 Sheets-Sheet 2

Inventor
Edward J. Quinn
By Geo. H. Kennedy Jr.
Attorney

Dec. 4, 1934.                E. J. QUINN                1,982,925
                      CLUTCH OPERATING MECHANISM
                 Filed April 24, 1930      3 Sheets-Sheet 3

Inventor
Edward J. Quinn

By Geo. H. Kennedy Jr.
Attorney

Patented Dec. 4, 1934

1,982,925

UNITED STATES PATENT OFFICE 1,982,925

CLUTCH OPERATING MECHANISM

Edward J. Quinn, Worcester, Mass., assignor to Morgan Construction Company, Worcester, Mass., a corporation of Massachusetts Application April 24, 1930, Serial No. 446,901

4 Claims. (Cl. 192—24)

The present invention relates to operating mechanism for clutches, and is adapted particularly for use with clutches in which the clutching elements are intermittently engaged and disengaged, to procure predetermined angular movements of a driven member, from a constantly rotating driving member.

In connection with the operation of heavy machinery requiring the transmission of considerable power, the movement of such clutching elements into and out of engagement with the necessary rapidity is almost impossible of accomplishment by hand, because of the weight and inertia of such parts. Moreover, when, as is often the case, the driven member or machine is only to be rotated through a single revolution or part of a revolution, the difficulties of hand operation of the clutch are increased, since it is not possible for an operator or attendant, especially when the parts to be moved are of large size, to effect their movements at the proper times.

It has heretofore been proposed, in the patents to Fuller No. 1,193,008, of August 1, 1916, Carroll, No. 1,383,525, of July 5, 1921, and Quinn, No. 1,479,732, of January 1, 1924, to obtain the engaging and disengaging movements of such a clutch by power supplied by the driving member. These arrangements, however, involve the addition of complicated and cumbersome operating mechanism which takes up much space and is extremely difficult to keep lubricated. An object of the present invention is to simplify a clutch operating mechanism of this character, by greatly reducing the number and size of its parts, and the space required to accommodate it. The apparatus also provides an automatic electric control for such a clutch operating mechanism, in proper interlocking relation to the application and release of a braking member for the intermittently driven machine, as fully set forth and claimed in my copending divisional application Serial No. 566,339, filed October 1, 1931. Other and further objects and advantages of the invention will be made apparent in the following detailed description thereof, in connection with which reference is had to the accompanying drawings, wherein—

Fig. 1 is a vertical sectional view illustrating the application of my invention to the intermittent drive of an actuating shaft for a shear or the like.

Like reference characters refer to like parts in the different figures.

Figure 1:
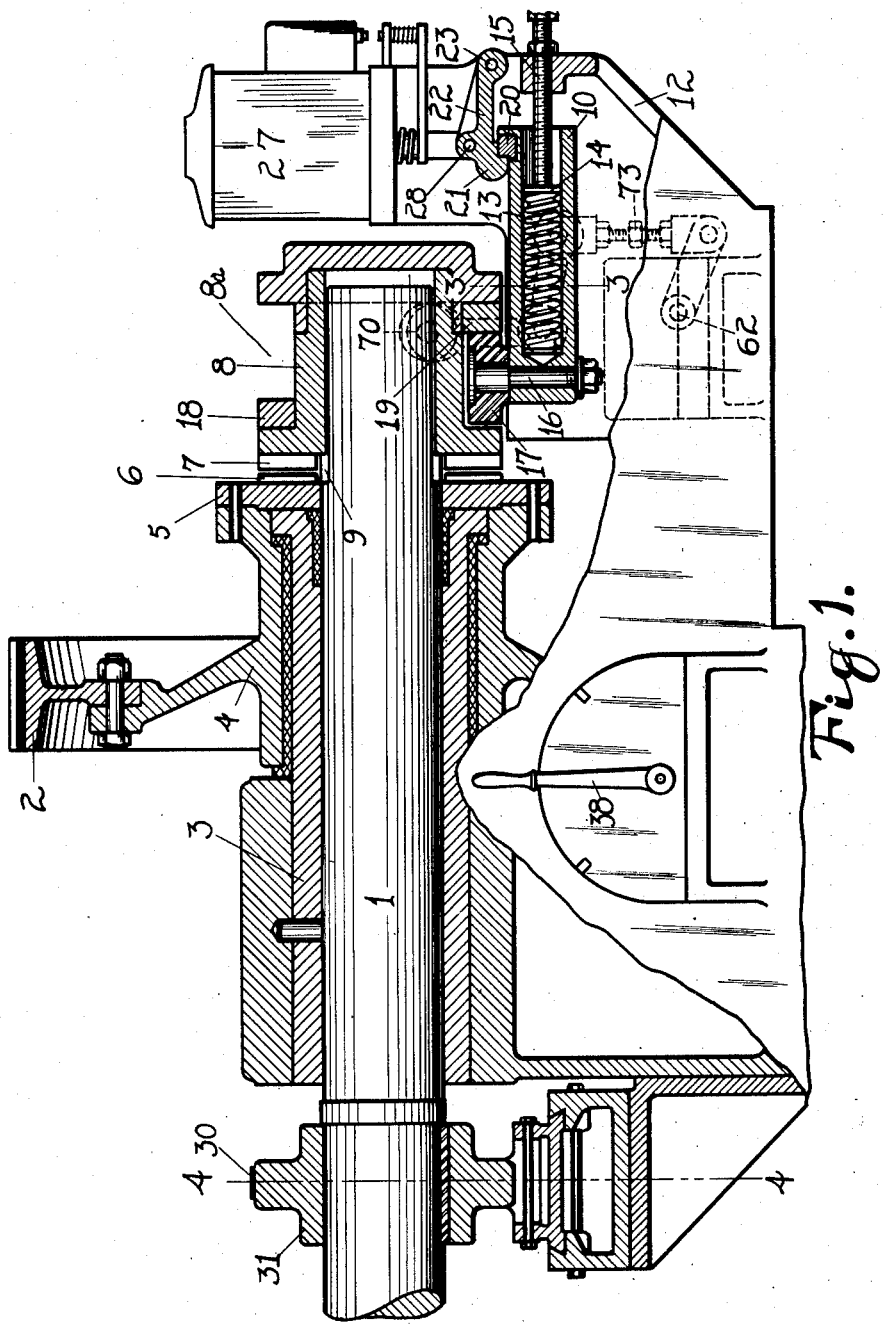

For purposes of illustration, I have shown the clutching mechanism of my invention, the same as in the aforesaid Quinn patent, as applied to the intermittent rotation of a driven shaft 1, which may be employed, for example, to operate a metal cutting shear or the like, not shown,— it being the function of the clutch to impart, at intervals, a predetermined angular movement to said shaft, for the purpose of procuring a single operation of the shear or other devices, and then to disconnect said shaft from the driving power, until another operation is desired. The driving power in the present instance is shown in the form of a continuously rotating gear 2 which receives its rotation from any suitable source of power, not shown, said driving member 2 being journalled on a stationary quill or sleeve 3, concentric with the driven member 1. The constantly rotating gear 2 has secured to its hub 4 a clutching member 5, providing a series of clutch teeth 6 which are adapted to cooperate with a similar series of clutch teeth 7 on a sliding clutch collar 8. The latter is mounted for sliding movement on the projecting end of driven shaft 1, said projecting end being squared or grooved as shown at 9 to prevent relative rotation between said collar 8 and the shaft 1. In the normal non-operative position of the parts, the collar 8 occupies the position shown in Fig. 1, with its clutch teeth 7 out of engagement with the rotating teeth 6 of driving member 2,—the driven shaft 1 under these conditions being stationary. When the collar 8 is moved to the left, Fig. 1, the clutch teeth 6 and 7 are engaged, resulting in the rotation of shaft 1 from the continuously rotating gear 2.

Figure 3:
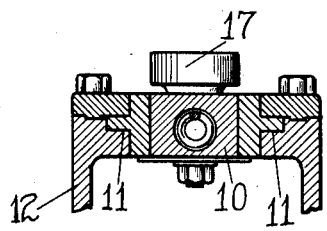
Fig. 3 is a large scale sectional view on the line 3—3 of Fig 1.

The mechanism for securing the movement of collar 8, to engage and disengage the clutch, is here shown as embodying a slidable member 10. As shown in Figs. 1 and 3, said member 10 is mounted for sliding movement, in a direction parallel to the axis of shaft 1, in suitable guideways 11, 11 provided by the frame bracket 12. The member 10 is constantly urged to the left, Fig. 1, by the expansive action of spring 13, the latter, as here shown, being contained within a lengthwise recess of said member 10, so as to press at one end against said member; at the other end, said spring is seated on a relatively stationary abutment 14, which is carried by a screw 15 adjustable in the frame bracket 12. By means of said screw, the member 14 is movable in and out, to vary, as desired, the expansive force of spring 13, by which the member 10 is urged to the left in Fig. 1.

Figure 3A:
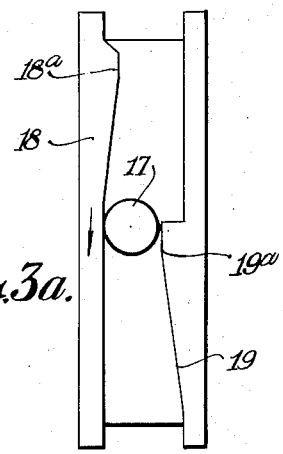
Fig. 3a is a developed view of the cam members shown in Fig. 1.
Figure 2:
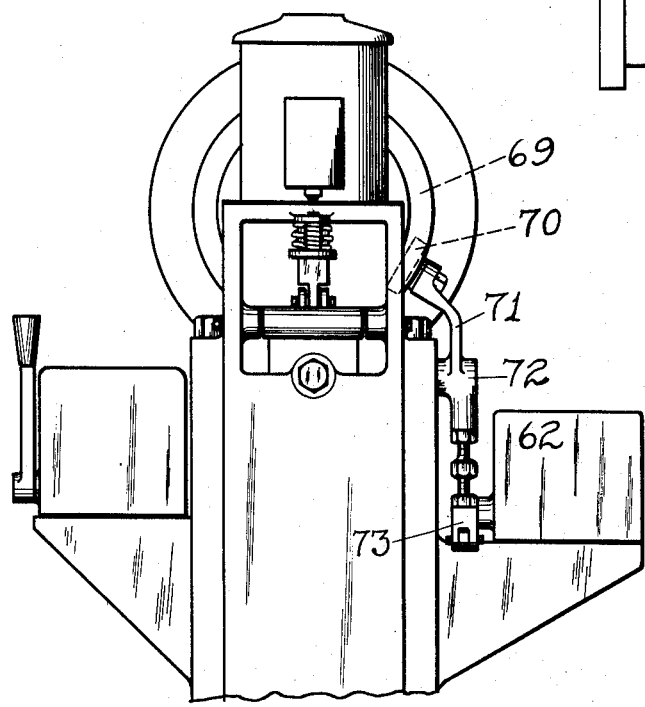
Fig. 2 is an end elevation of the mechanism shown in Fig. 1.

The slidable member 10 carries a pin 16, whereon is journalled a roller 17 received in a circumferential groove 8a of clutch collar 8. The sides of said groove are in the form of cam surfaces 18 and 19, as hereinafter described, for cooperation with roller 17 to obtain the engaging and disengaging movements of the clutch collar 8. The normal position of member 10, when the clutch is disengaged, is shown in Fig. 1 as involving a retraction of said member to the right, far enough to dispose a shoulder 20 thereof behind the hooked end 21 of a latch member 22, which is pivoted as shown at 23. When said latch member 22 is lifted clear of shoulder 20 (as by the solenoid operation hereinafter described), the spring 13 is released to thrust the member 10 sharply to the left, Fig. 1, and thus through the roller 17 to shift the collar 8 in the same direction, causing its teeth 7 to engage with the teeth 6 of driving member 2. This engagement inaugurates the desired single revolution of the driven shaft 1, through the latter's connection 9 with collar 8. During approximately the first half of such revolution, as shown by the upper part of Fig. 3a, the roller 17 is being gradually pushed to the right, Fig. 1, by the cam surface 18, this action causing compression of the spring 13 under the right hand movement of member 10. When the high portion 18a of said cam reaches roller 17, the member 10 will have been forced to the right far enough to reengage its shoulder 20 behind the latch 22, thus reloading the spring and preventing any further left hand shifting of roller 17 until the latch 22 is again raised to inaugurate another single revolution of the driven member 1. During the remaining portion of the single revolution that follows this locking of roller 17 in its extreme right hand position, the cam surface 18 is no longer effective; on the other hand, the cam surface 19, beginning from the lowest portion thereof represented in Fig. 3a, is brought against roller 17, and inasmuch as said roller, because of its being locked against left hand movement, cannot respond to the left hand thrust imparted by said cam 19, the reaction between said roller 17 and said cam 19 results in a gradual right hand shifting of collar 8 on the driven shaft 1,—this culminating, at the completion of 360° of movement, with the arrival against said roller of the high portion 19a of the cam, which secures a sufficient right hand displacement of collar 8 on shaft 1 to carry the teeth 7 out of engagement with the driving teeth 6, thereby bringing the shaft 1 to rest at the completion of a single revolution, in the position shown by Fig. 1.

Figure 5:
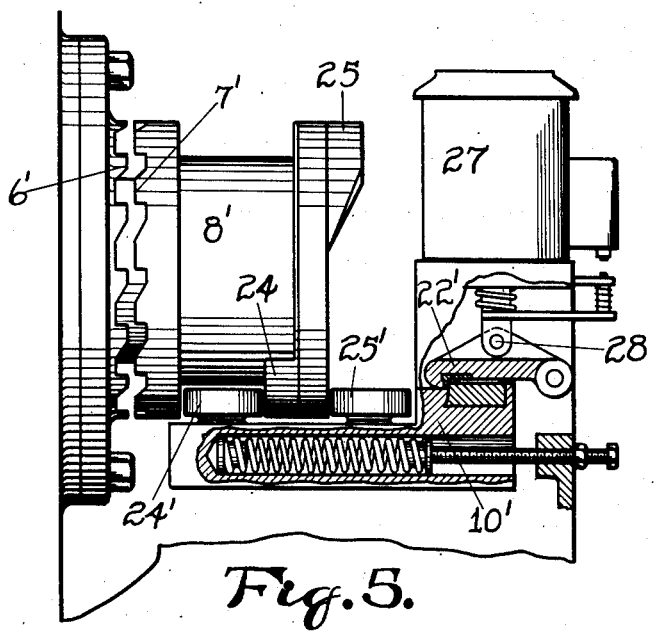
Fig. 5 is a fragmentary sectional view similar to Fig. 1, illustrating a modified form of the invention.

Referring now to Fig. 5, I have shown a somewhat modified construction of the clutching and unclutching mechanism, as embodied in a slidable collar 8', which provides a pair of cam surfaces 24 and 25, and an operating member 10' which carries, for coaction with the respective cams, the two rollers 24' and 25'. When the latch 22' is raised to release said member 10' for its left hand movement, the engagement of roller 25' with the end of the collar 8', shifts the latter into clutching position,—this occurring when the effective surface of cam 25 is angularly displaced from said roller 25'; the ensuing rotation, substantially in the same manner as described for Fig. 1, carries the high portion of cam 25 against said roller 25' and thereby returns the member 10' to its latched position. Thereafter, just before a single revolution of the shaft 1 has been completed, the cam 24, like the cam 19 of Fig. 1, becomes effective on the roller 24', and since said roller, by its attachment to member 10', is locked against left hand movement, a right hand movement of the collar 8' must take place to disengage the clutch teeth 6' and 7'.

Figure 4:
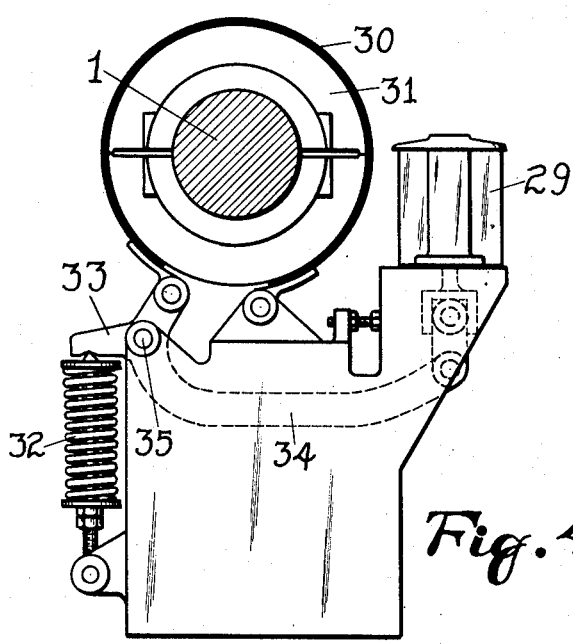
Fig. 4 is a large scale sectional view on the line 4—4 of Fig. 1.

The operation of the latch 22 or 22', as the case may be, is preferably controlled, according to my invention, by a suitable solenoid, designated at 27 in Fig. 1 and also in Fig. 5,—the plunger of said solenoid being connected, as shown at 28, to the latch, so that when the solenoid is energized, the latch will be lifted to bring about an operation of the clutch, in the manner above described. Also, as best shown in Fig. 4, I employ a second solenoid 29 to effect, upon its energization, the release of a brake 30 which encircles a suitable drum 31 on the driven shaft 1, said brake being normally held contracted on said drum by a spring 32 acting through a lever 33. The plunger of solenoid 29 has a link connection 34 with the rock shaft 35, from which the lever 33 projects, so that when said solenoid is energized, the shaft 35 is rocked in such a direction as to overcome the force of spring 32, thereby permitting the brake 30 to expand on drum 31, to release the shaft 1 for free rotation. The control and operation of the solenoids 27 and 29 is effected in any suitable manner as by the arrangement of electrical apparatus shown, described and claimed in my aforesaid copending divisional application Serial No. 566,339, filed October 1, 1931.

I claim,

1. The combination with driving and driven elements and a clutch device movable in opposite directions to clutch and unclutch said elements, of a spring-pressed operating member for said clutch device, a roller carried by said member in constant operative relation to said clutch device and adapted to transmit thereto the pressure of said spring, to engage said clutch device, for the driving of said driven element, and a pair of cams brought into action by such driving and operating successively on said roller to return said operating member to normal position and to shift said clutch device into non-engaging position.

2. The combination with driving and driven elements and a clutch device movable in opposite directions to clutch and unclutch said elements, of a spring-pressed operating member for said clutch device, a pair of rollers carried by said member in constant operative relation to said clutch device, one of said rollers adapted to transmit thereto the pressure of said spring, to engage said clutch device, a cam on said clutch device operative against the last-mentioned roller to return said operating member to normal position, and a second cam cooperating with the other roller to shift said clutch device into non-engaging position.

3. The combination with driving and driven elements, of a clutch device movable in opposite directions to clutch and unclutch said elements, an actuating member for said clutch device, a spring for producing movement in one direction of said actuating member, thereby to move said clutch device into clutching position for the driving of said driven element, cam means on said clutch device, and roller means carried by said actuating member in constant operative relation to said clutch device, said cam and roller means cooperating, in response to such driving of the driven element, for first producing movement of said actuating member in the other direction to restore the force of said spring, and for then shifting said clutch device into unclutched position.

4. The combination with driving and driven elements, of a clutch device movable in opposite directions to clutch and unclutch said elements, a rectilinearly movable actuating member for said clutch device, a spring for producing rectilinear movement in one direction of said actuating member, thereby to move said clutch device into clutching position for the driving of said driven element, a cam on said clutch device, and a cam follower carried by said actuating member in constant operative relation to said cam, said cam follower cooperating, in response to such driving of the driven element, for first producing rectilinear movement in the other direction of said actuating member, to compress said spring, and for then moving said clutch device into unclutching position.

EDWARD J. QUINN.